June 2, 1970 I. B. COOPER 3,516,089
SHIFT REGISTER CONTROLLED SCANNING FUNCTION MONITOR
Filed May 10, 1967 2 Sheets-Sheet 1

June 2, 1970 I. B. COOPER 3,516,089

SHIFT REGISTER CONTROLLED SCANNING FUNCTION MONITOR

Filed May 10, 1967 2 Sheets-Sheet 2

United States Patent Office 3,516,089

Patented June 2, 1970

3,516,089

SHIFT REGISTER CONTROLLED SCANNING FUNCTION MONITOR

Irving Brooks Cooper, Marblehead, Mass., assignor to Industrial Instrumentations, Inc., Marblehead, Mass., a corporation of Massachusetts Filed May 10, 1967, Ser. No. 637,412
Int. Cl. G08b 26/00
U.S. Cl. 340—413 9 Claims

ABSTRACT OF THE DISCLOSURE

A monitor system for a group of function generators includes in a sending unit a shift register which sequentially samples a group of input AND circuits connected to the function generators. With each sampling operation a 1900 c.p.s. tone burst is produced followed by a 1300 c.p.s. tone burst if the sampled AND circuit has an output. At the end of each shift register cycle an 850 c.p.s. tone burst is produced. This series of tone bursts are transmitted over a two wire telephone circuit to a receiving unit for application to 1900 c.p.s., 1300 c.p.s. and 850 c.p.s. band pass filters. The signal passed by the 1900 c.p.s. filter steps a second shift register to channel the data sigals passed by the 1300 c.p.s. filter to appropriate output units and the signals passed by the 850 c.p.s. filter synchronizes the second shift register with each cycle of the first shift register. An alarm circuit is actuated if the 1900 c.p.s. signals are absent for approximately one complete shift register cycle.

This invention relates to monitoring systems and more particularly to systems for transmitting monitored data between two relatively widely spaced locations.

It is an object of this invention to provide a novel and improved function monitoring system for transmitting monitored function information between two relatively widely spaced locations utilizing a simple and reliable transmission link.

Another object of the invention is to provide novel and improved function monitoring apparatus that enables transmission of function information to a remote location in an economical manner and with inherent detection of failure of components of the apparatus.

Another object of the invention is to provide a novel and improved function monitoring system which enables a continual presentation of the status of a plurality of monitored functions in a system that employs a two wire or similar type of transmission link.

In accordance with the invention there is provided a monitoring system for transmitting function information between two relatively widely spaced locations. At one location there is provided a set of function sensors, each sensor being responsive to the output of an associated function generator, and at the second location is provided a corresponding number of receivers for storing or otherwise indicating the status of the monitored functions at the first location as sensed by the associated sensors. The system further includes at the first location a sequencer for sampling the series of sensors and a sequencer control; a first coder for coding function information for transmission at a first frequency, a second coder for coding sequencer synchronizing information for transmission at a second frequency, and a third coder for coding sequencer control information for transmission at a third frequency. The system at the second location includes three individual band pass filters respectively tuned to said first, second and third frequencies; a sequencer responsive to the output of one filter for controlling transmission of the output from a second filter to the respective receiver devices and circuitry responsive to the output of the third filter for controlling the resetting of the sequencer in a synchronizing operation. The system enables the use of a simple transmission link between the two locations such as a two wire line which may be a telephone circuit and enables the transmission of data from a multiplicity of function generators at the first location over that common two wire line for recording or display or other use on the corresponding receiver devices at the second location.

In a particular embodiment the sequencers are shift registers, one of which sequentially conditions sensor outputs in a sampling operation and transmits available function information for coding by the first frequency coding unit. Each shift register sampling output is also applied to actuate the second coding unit and at the end of each sampling cycle the shift register control produces a reference for actuating the third coding unit. The function sensor circuitry is organized to provide fail safe features. Also, in that particular embodiment the coding frequencies are selected so that the data or information frequency is between the sequencing frequency and the control frequency and these frequencies are selected so that their harmonics are independent and distinct with respect to one another.

At the receiving station where the system is used for monitoring a machine operating condition, for example, signal stretching networks are employed to maintain the output device energized for the duration of the sampling cycle so that a continuous indication of the monitored function is indicated at the second location. The receiving station also includes alarm circuits in an arrangement which allows signalling of transmission link failure as well as failure or other improper operation of the function sensor circuitry.

Other objects, features, and advantages of the invention will be seen as the following description of a particular embodiment of the invention progresses, in conjunction with the drawing, in which.

DESCRIPTION OF PARTICULAR EMBODIMENTS

Figure 1:
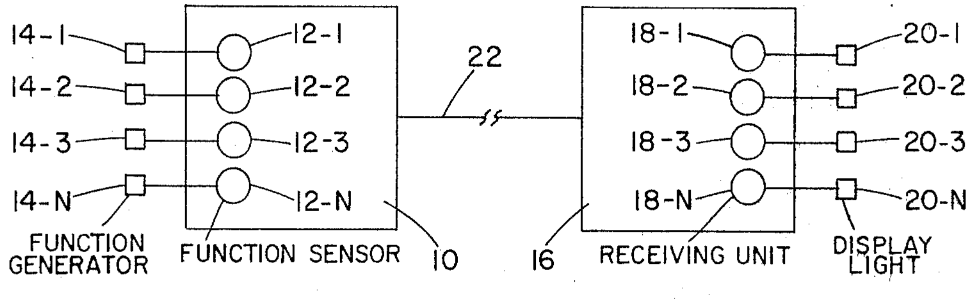
FIG. 1 is a block diagram of a function monitoring system constructed in accordance with the invention.

With reference to FIG. 1 a function sensing unit 10 is located at a first location which includes a series of function sensors 12-1–12-N adapted to be coupled to function generators such as machines 14-1–14-N. At a second location is a receiving unit 16 that includes a plurality of receiving units 18-1–18-N corresponding to the sensors 12 which may be connected to suitable readout equipment such as computer or printers or a bank of display lights 20-1–20-N. A two wire transmission line 22 connects the sensor unit 10 and the receiver unit 16.

Figure 2:
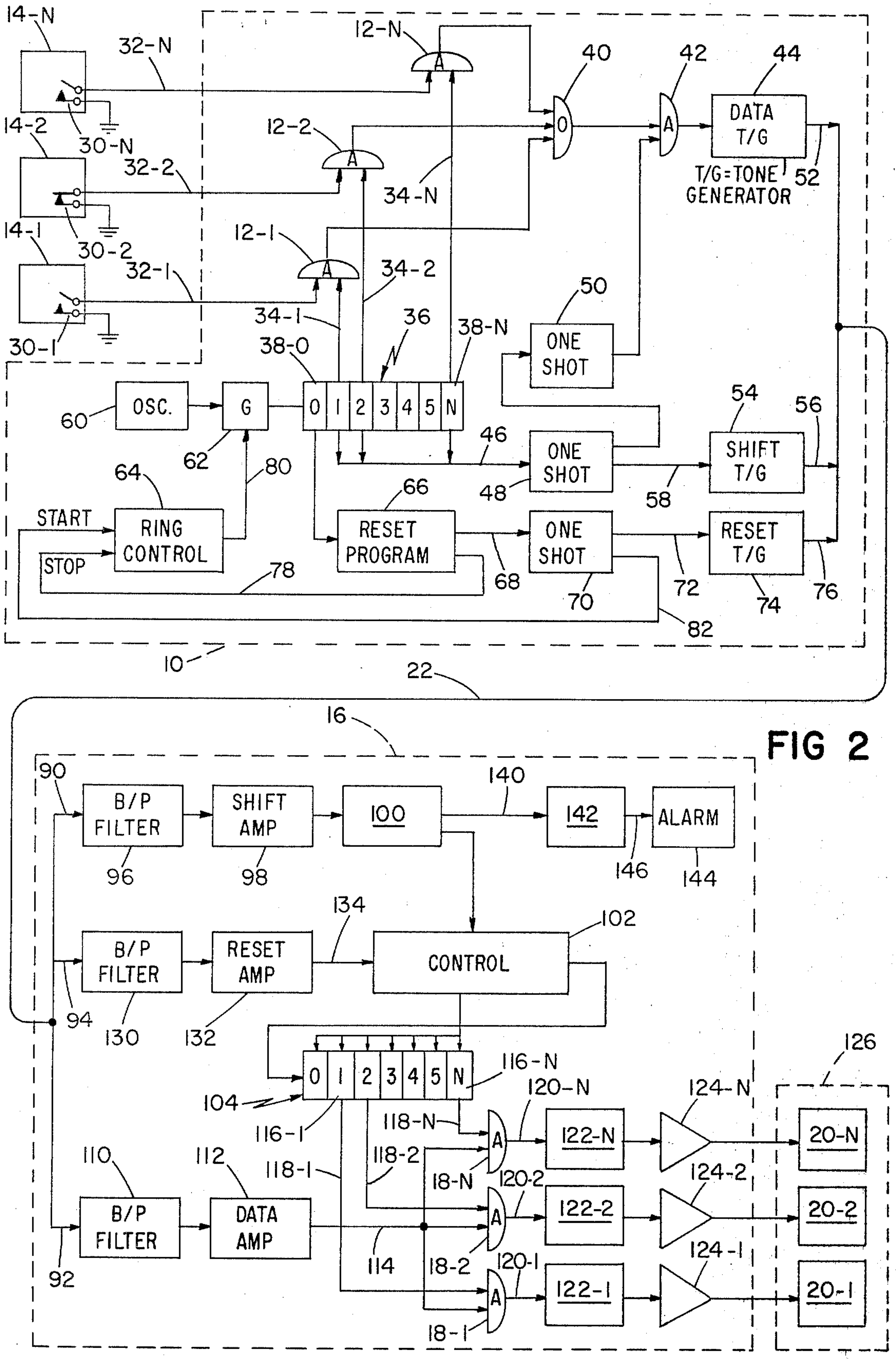
FIG. 2 is a schematic diagram of the function monitoring system shown in FIG. 1.

With reference to FIG. 2, each function generator 14 includes a switch 30. In the illustrated embodiment each switch 30 is closed in the normal condition, for example, when its supervised machine 14 is off. The output of each switch 30 supplied over a line 32 to a condition sensor circuit 12 of the AND type, line 32 in ungrounded condition providing a conditioning input to the AND circuit 12. The sensor unit also includes a sequencer form of shift register 36 which has a series of stages 38-0–38-N. The outputs of stages 38-1–38-N are applied as sampling outputs over lines 34 to the respective sensor units 12-1–12-N and each sensor unit, in response to the conjoint application of a conditioning level and a gating signal produces an output which is supplied via OR unit 40 to a gating unit 42 for application to data tone generator 44 which when actuated produces an output signal of 1300 cycles per second frequency.

The outputs of shift register stages 38-1–38-N are also applied over common output line 46 to trigger a "one shot" circuit 48 of the type which produces a fixed duration output pulse when triggered. The unit 48 produces an output signal which, when it terminates, triggers a corresponding "one shot" circuit 50 that produces an output that conditions data transfer gate 42 to transfer a data signal (if OR circuit 40 is conditioned) to cause tone generator 44 to produce an output on line 52. The output of "one shot" circuit 48 also actuates a second tone generator 54 which is designed to produce a 1900 cycles per second output signal on line 56 in response to an input signal on line 58. As circuit 50 produces an output only when circuit 48 does not, the data signals on line 52 are separated in time from the sequencer synchronizing signals on line 56.

The sequencer control includes an oscillator 60 which produces output signals at a twenty cycles per second repetition rate which are gated by gate 62 for stepping shift register 36. Gate 62 is conditioned by ring control circuit 64 which responds to reset program circuit 66 to which the output of register stage 38-0 is connected. The output of programmer 66 over line 68 energizes "one shot" circuit 70 to provide an output signal of predetermined time duration (a typical value being about one hundred milliseconds) over line 72 to cause tone generator 74 to produce on line 76 an output signal of 850 cycles per second frequency. The output of programmer 66 is also applied over line 78 to ring control 64 to remove the gate conditioning level from line 80.

When the output pulse of circuit 70 terminates, the resulting transition applied over line 82 allows ring control 64 to condition gate 62 over line 80 and the shift register 36 is stepped to stage 38-1 by the next pulse from oscillator 60. A suitable circuit arrangement for this shift register and ring control is disclosed in my co-pending patent application Ser. No. 559,330 filed June 21, 1966.

The output lines 52, 56, and 76 are connected together to the two wire telephone transmission line 22.

The receiving unit 16 has three input lines 90, 92, and 94 connected to transmission line 22. A 1900 cycles per second band pass filter 96 is connected to input line 90 and its output is applied through shift amplifier 98 and monostable multivibrator 100 (which is utilized for signal shaping purposes) to a shift register control unit 102 which applies stepping pulses to the receiver shift register 104. Connected to input line 92 is a band pass filter 110 tuned to pass the 1300 cycles per second signal for application to data amplifier 112 which amplifier produces on output line 114 the data signal for application to all of the receiver unit gates 18-1–18-N.

A gating input to each gate 18 is applied from corresponding stage 116-1–116-N of shift register 104 over lines 118-1–118-N. When a gate, conditioned by an output from data amplifier 112, is sampled by an output from the corresponding stage of shift register 104, a signal is passed over the corresponding line 120 for application to pulse stretcher 122 and amplifier 124 to output unit 20 such as a lamp on a display panel 126.

The input line 94 is connected to band pass filter 130 which is tuned to pass the 850 cycles per second signal for application to amplifier 132. The output of amplifier 132, supplied over line 134, resets the shift register control unit 102 which acts to reset the shift register to stage 116-0 in a synchronizing operation.

A further feature of the circuit is the use of a second output from monostaple multivibrator 100 over line 140 for application to pulse stretcher 142. A line failure alarm circuit 144 is connected to the output of pulse stretcher 142. As long as monostable multivibrator 100 produces a shift signal at regular intervals, pulse stretcher 144 produces an output on line 146 which exceeds a threshold value so that alarm 144 is not actuated. Should the interval between shift pulses from monostable multivibrator 100 exceed a predetermined value such as through the failure of the transmission line 22, the alarm circuit 144 will produce an output signifying this fact. It will be noted that the logic will similarly detect an abnormal condition such as interruption of a line 32. In such case the indicator 20 corresponding to the interrupted line will be energized and signal this deviation from the normal condition.

Figure 3:
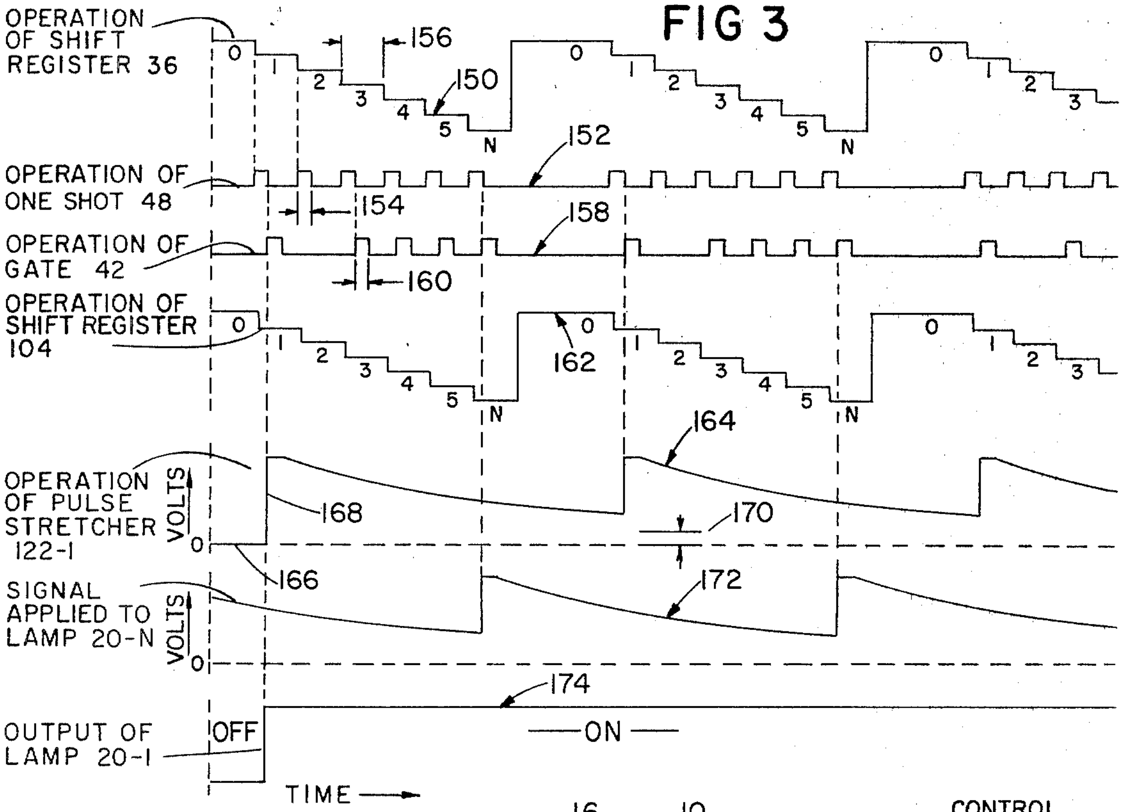
FIG. 3 is a timing diagram of the operation of the system as shown in FIG. 2.

The operation of the system, it is believed, will be understood with reference to the timing diagram shown in FIG. 3. Curve 150 indicates the timing duration and operation of shift register 36. It will be noted that the intervals of stages 1-N of shift register 36 are equal and occur at the frequency of the output of oscillator 60 while the time that the shift register remains at stage zero is somewhat longer. The curve 152 indicates the outputs of "one shot" circuit 48 which outputs are generated in response to the stepping of the shift register from one stage to the next and are of a fixed duration 154 that is shorter than the interval 156 that register 36 remains at each stage. The curve 158 represents the output of gate circuit 42 as applied to tone generator 44. It will be seen that the output is a function controlled by "one shot" circuit 50 which produces an output in response to the termination of the output of "one shot" circuit 48 and is of a duration 160 which together with duration 154 is shorter than the shift frequency duration 156. It will be noted that, as switch 30-2 is closed (a normal condition) gate 42 does not produce an output at time 2 as AND circuit 12-2 is not conditioned.

Curve 162 represents the stepping of receiver shift register 104 which is stepped in response to the 1900 cycle per second shift signals over line 56 (indicated by curve 152). Curve 164 indicates the output of pulse stretcher 122–1 which rises rapidly from a base 166 as indicated by line 168 when the switch 30–1 is first opened and gate 34–1 is sampled. The output of the pulse stretcher remains at a magnitude above the threshold level 170 of lamp 20–1 so that lamp remains energized through the next shift register cycle. The signal applied to lamp 20–N is indicated by curve 172 and the output of lamp 20–1 is indicated by curve 174.

Figure 4:
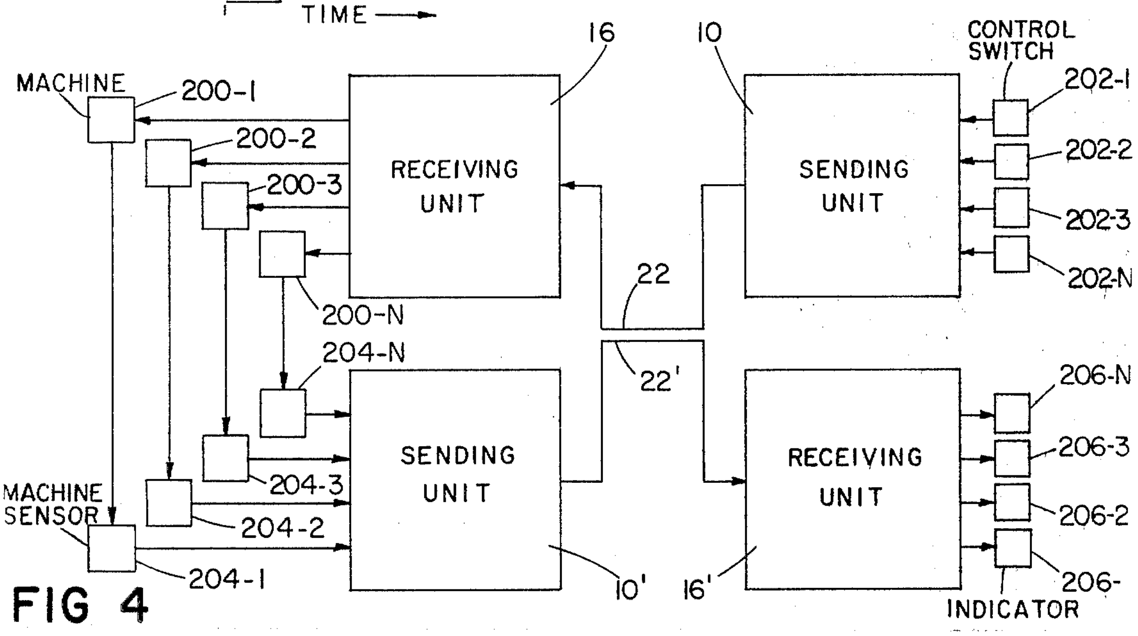
FIG. 4 is a block diagram of a control system employing a duplex arrangement of monitoring systems.

A control system employing a system of the invention is indicated in FIG. 4. In that control system a series of machines 200-1–200-N are to be controlled by corresponding switches 200-1–202-N at a remote location. Each machine has associated with it a sensor 204-1–204-N and at the control station there is a series of indicators 206-1–206-N. A sending unit 10 is provided for response to control switches 202-1–202-N and a receiving unit 16 in response to signals from unit 10 produces outputs to operate machine controls 200-1–200-N. Similar sending unit 10′ is connected to the machine sensors 204 and a similar receiving unit 16′ applies signals to indicators 206. A first two wire transmission line 22 is connected between units 10 and 16 and a second transmission line 22′ is connected between units 10′ and 16′. (Through appropriate selection of different frequencies for units 10 and 10′ a single two wire transmission system may be utilized but the simplicity, convenience and signal isolation provided by the system illustrated in FIG. 2 has been found to justify the use of a separate two wire transmission line 22′ in such an arrangement.)

In operation, when a control switch 202 is actuated, unit 10 generates a signal which is translated by unit 16 to turn on the corresponding machine 200. The turn-on of that machine is sensed by the corresponding sensor 204 and sensing unit 10′ responds and transmits a signal over line 22′ to receiver unit 16′ to actuate the corresponding indicator 206.

While particular embodiments of the invention have been shown and described, it will be obvious to those skilled in the art that a variety of monitoring systems may employ the invention. For example, data from card readers at a multiplicity of locations at a building, for example, may be coded as functions and applied over a telephone transmission line for recording at a remote loction to control a computer, for example, or for data inventory purposes or function monitoring of greater complexity than the embodiments described above. Other embodiments will be apparent to those skilled in the art. Therefore, it is not intended that the invention be limited to the embodiments described in detail or to details thereof and departures may be made therefrom within the spirit and scope of the invention as defined in the claims.

What is claimed is:

1. A monitoring system for transmitting function information between two relatively widely spaced locations, comprising a plurality of sensors at a first location, each said sensor being responsive to the output of a corresponding function generator, a corresponding plurality of receiving units at said second location, each said receiving unit corresponding to one of said sensors at said first location, The apparatus at said first location including a first sequencer for sampling said sensors sequentially, sequencer control for controlling the operation of said first sequencer, a first coder for coding function information for transmission at a first frequency, a second coder for coding sequencer synchronizing information for transmission at a second unique frequency, a third coder for coding sequencer control information for transmission at a third unique frequency, and means for applying the outputs of the said first, second and third coders to a common transmission link; and the apparatus at said second location including a gating element in each said receiving unit, a first filter tuned to pass said first frequency, a second filter tuned to pass said second frequency, a third filter tuned to pass said third frequency, a second sequencer responsive to the output of said second filter, the outputs of said second sequencer being applied to the gating elements for controlling the application of the outputs from said first filter to said receiving units as a function of the output of said second sequencer, and circuitry responsive to the output of said third filter for resetting said second sequencer.

2. The system as claimed in claim 1 wherein each said sequencer is a shift register.

3. The system as claimed in claim 1 wherein each said coder is a tone generator, the frequency output of said first coder being intermediate the output frequencies of said second and third coders.

4. The system as claimed in claim 1 and further including an alarm circuit for producing an alarm signal in response to the absence of the regular occurrence of said outputs of said second filter.

5. The system as claimed in claim 1 and further including a signal stretching network interposed between each said gating element and the output of the associated receiving unit, said network having a time duration duration characteristic slightly in excess of the duration of the sequencer cycle for maintaining the receiver output in continuously energized condition, after energization, throughout each sequencer cycle.

6. The system as claimed in claim 1 wherein said first sequencer produces a series of sensor sampling levels in each sequencer cycle, and further including a first control responsive to each said sequencer sampling level for actuating said second coder at a first interval during generation of each said sampling level, and a second control responsive to each said sequencer sampling level for producing a first coder enabling signal at a second interval different from said first interval during generation of each said sampling level.

7. The system as claimed in claim 6 wherein said sequencer is a shift register, each said function sensor is an AND circuit arranged to produce an output in response to a sampling level from said shift register when the associated function generator is producing an abnormal function output, said first and second controls are "one shot" circuits, said second control being responsive to said first control, and each said coder is a tone generator.

8. The system as claimed in claim 7 and further including a signal stretching network interposed between each said gating element and the output of the associated receiving unit, said network having a time duration characteristic slightly in excess of the duration of the sequencer cycle for maintaining the receiver output in continuoisly energized condition, after energization, throughout each sequencer cycle.

9. The system as claimed in claim 8 and further including an alarm circuit for producing an alarm signal in response to the absence of the regular occurrence of said outputs of said second filter.

References Cited

UNITED STATES PATENTS

| | | | |
|---|---|---|---|
| 2,987,712 | 6/1961 | Polyzou | 340—413 |
| 3,009,134 | 11/1961 | Brosh | 340—413 |
| 3,205,308 | 9/1965 | Calvert | 340—413 |

THOMAS B. HABECKER, Primary Examiner

U.S. Cl. X.R.

340—171